United States Patent
Sung et al.

(10) Patent No.: US 7,730,289 B2
(45) Date of Patent: Jun. 1, 2010

(54) METHOD FOR PRELOADING DATA IN A CPU PIPELINE

(75) Inventors: I-Jui Sung, Changhua County (TW); Ming-Chung Kao, Hsinchu County (TW)

(73) Assignee: Faraday Technology Corp., Hsin-Chu (TW)

( * ) Notice: Subject to any disclaimer, the term of this patent is extended or adjusted under 35 U.S.C. 154(b) by 315 days.

(21) Appl. No.: 11/862,816

(22) Filed: Sep. 27, 2007

(65) Prior Publication Data

US 2009/0089548 A1 Apr. 2, 2009

(51) Int. Cl.
 G06F 7/38 (2006.01)
 G06F 9/00 (2006.01)
 G06F 9/44 (2006.01)
(52) U.S. Cl. .............. 712/225; 712/207; 712/219
(58) Field of Classification Search .................. 712/225
 See application file for complete search history.

(56) References Cited

U.S. PATENT DOCUMENTS

| 6,950,925 | B1 | 9/2005 | Sander et al. |
| 7,024,537 | B2 | 4/2006 | Pickett et al. |
| 7,089,400 | B1 | 8/2006 | Pickett et al. |
| 7,500,061 | B2 * | 3/2009 | Maeda et al. ............... 711/137 |

OTHER PUBLICATIONS

Chen et al., "An Efficient Architecture for Loop Based Data Preloading", 1992.*

* cited by examiner

Primary Examiner—Alford W Kindred
Assistant Examiner—Jesse R Moll
(74) Attorney, Agent, or Firm—Winston Hsu

(57) ABSTRACT

A method for preloading data in a CPU pipeline is provided, which includes the following steps. When a hint instruction is executed, allocate and initiate an entry in a preload table. When a load instruction is fetched, load a piece of data from a memory into the entry according to the entry. When a use instruction which uses the data loaded by the load instruction is executed, forward the data for the use instruction from the entry instead of from the memory. When the load instruction is executed, update the entry according to the load instruction.

18 Claims, 3 Drawing Sheets

| PCLD | VEA | EA | VDT | DATA | STRIDE |
|------|-----|----|----|------|--------|
|      |     |    |    |      |        |
|      |     |    |    |      |        |
|      |     |    |    |      |        |

FIG. 1

```
    PLD  L1,  8
LOOP_BEGIN:
 . . .
L1:LDR  R0,  [R10]
   ADD  R2,  R1,  R0
   ADD  R10, R10, #8
 . . .
   BLE  LOOP_BEGIN
```

FIG. 3

| Row | Step | Fields | | | | | |
|---|---|---|---|---|---|---|---|
| | | PCLD | VEA | EA | VDT | DATA | STRIDE |
| 1 | 205 | L1 | 0 | – | 0 | – | 8 |
| 2 | 260 | L1 | 1 | array1+8 | 0 | – | 8 |
| 3 | 220 | L1 | 1 | array1+8 | 1 | *(array1+8) | 8 |
| 4 | 260 | L1 | 1 | array1+16 | 0 | – | 8 |

FIG. 4

METHOD FOR PRELOADING DATA IN A CPU PIPELINE

BACKGROUND OF THE INVENTION

1. Field of the Invention

The present invention relates to a pipeline in a central processing unit (CPU). More particularly, the present invention relates to a method for preloading data in a CPU pipeline.

2. Description of the Related Art

As the CPU gets faster and faster and the pipeline gets deeper and deeper, the speed of the memory relative to the CPU gets slower and slower. As a result, when loading data from a memory, the CPU has to wait more and more cycles. Such memory load latency stalls the pipeline and decreases pipeline throughput. In some cases, for example in instruction loops, the CPU is idle in 30% of the time because of memory load latency. The waste of CPU resources is very undesirable.

A conventional solution to this problem is hiding memory load latency. The hiding can be implemented by software or hardware.

The software approach is unroll-and-jamming the loop, and try to hide the latency by rescheduling the core loop. However, unroll-and-jamming the loop increases its foot print in the instruction cache, occupying precious cache space. Rescheduling the core loop means moving load instructions forward to hide the memory load latency. The moved load instructions need registers to store the loaded data. Sometimes the registers in the CPU are not enough to store all the loaded data. Moreover, not all loops are suitable for unroll-and-jamming.

The hardware approach uses specialized hardware to perform data speculation based on addressing patterns of load instructions. However, the cost of speculation hardware is still high. The speculation is not accurate enough. Besides, the speculation hardware cannot handle general instruction loops.

SUMMARY OF THE INVENTION

Accordingly, the present invention is directed to a method for preloading data in a CPU pipeline. The method uses hint instructions and a hardware preload table to implement data preloading in order to shorten or completely hide memory load latency in instruction loops. The hardware implementation of the method is simple and features a low cost. The data preloading of the method is accurate and is capable of handling general instruction loops.

According to an embodiment of the present invention, a method for preloading data in a CPU pipeline is provided, which includes the following steps. (a) When a hint instruction is executed, allocate and initiate an entry in a preload table. (b) When a load instruction is fetched, load a data from a memory into the entry according to the entry. (c) When a use instruction which uses the data loaded by the load instruction is executed, load the data for the use instruction from the entry instead of from the memory. (d) When the load instruction is executed, update the entry according to the load instruction.

In an embodiment of the present invention, the preload table entry includes an instruction address field, an effective address field, a data field, and a stride field.

In an embodiment of the present invention, step (a) includes the following steps. Set the instruction address field and the stride field according to the hint instruction. Mark the effective address field and the data field as invalid.

In an embodiment of the present invention, the address parameter is the address of the load instruction.

In an embodiment of the present invention, step (b) includes the following steps. Locate the entry in the preload table by matching the address of the load instruction with the instruction address field of the preload table entries. If the effective address field is valid, load the data from the memory into the data field using the effective address field as the memory address, and mark the data field as valid.

In an embodiment of the present invention, step (c) includes the following steps. Locate the entry in the preload table by matching the address of the load instruction with the instruction address field. If the data field is valid, load the data for the use instruction from the data field instead of from the memory.

In an embodiment of the present invention, step (d) includes the following steps. Locate the entry in the preload table by matching the address of the load instruction with the instruction address field. Store the sum of the effective loading address generated by the load instruction and the stride field into the effective address field. Mark the effective address field as valid, and mark the data field as invalid.

In an embodiment of the present invention, the entry further comprises an address validity field and a data validity field. The effective address field is marked as valid by setting the address validity field and the effective address field is marked as invalid by resetting the address validity field. The data field is marked as valid by setting the data validity field and the data field is marked as invalid by resetting the data validity field.

In an embodiment of the present invention, the load instruction and the use instruction are included in an instruction loop. The hint instruction is placed before the instruction loop. The stride field is the increment of the effective loading address generated by the load instruction between two consecutive iterations of the instruction loop.

In an embodiment of the present invention, step (d) further includes the following steps. Compare the data loaded by the load instruction and the data loaded into the entry in step (b). If the data loaded by the load instruction are not equal to the data loaded in step (b), flush the CPU pipeline, starting from the use instruction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 shows a preload table used in an embodiment of the present invention.

FIG. 3 shows an instruction loop used as an example in an embodiment of the present invention.

FIG. 4 shows the contents of a preload table entry in the example in FIG. 3.

DESCRIPTION OF THE EMBODIMENTS

Figure 2:
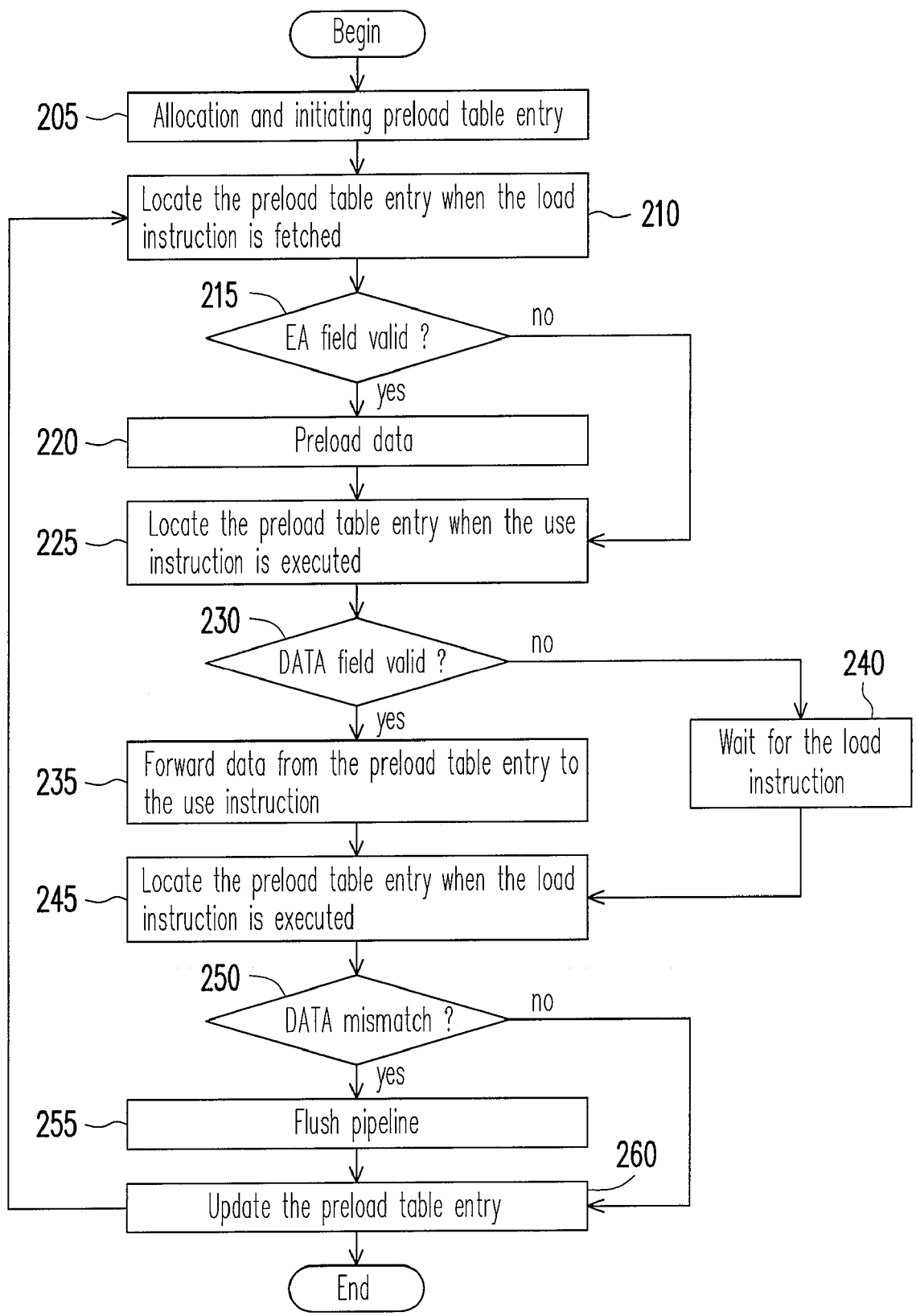
FIG. 2 is a flow chart of the method for preloading data in a CPU pipeline according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1:
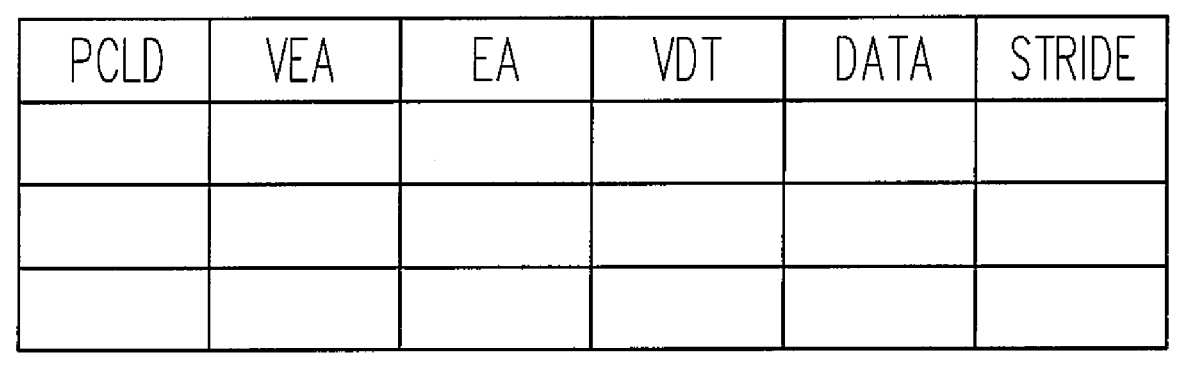

FIG. 1 shows the preload table used in an embodiment of the present invention. This embodiment uses a hint instruction to notify the CPU in advance the execution of an instruction loop containing a load instruction to be preloaded. The instruction loop includes a load instruction and a use instruction which uses the data loaded by the load instruction. When the hint instruction is executed, a preload table entry corresponding to the load instruction is allocated and initiated in the preload table. Later, when the load instruction is fetched, the data are preloaded into the entry according to a predicted memory address, so that the use instruction can use the preloaded data in the entry instead of waiting for the loading of the data from the memory. This preloading mechanism advances the loading of memory data from the execution stage of the load instruction to the fetching stage of the load instruction, thus shortening or completely hiding memory load latency.

Although the preload table in FIG. 1 has space for only three entries, the preload table is not limited to any specific size. Each entry in the preload table includes six fields, namely, PCLD, VEA, EA, VDT, DATA, and STRIDE. The PCLD field is the address of the load instruction, which is used to locate the entry in the preload table. The PCLD field can, but not necessarily, store the full address of the corresponding load instruction. Instead, the PCLD field may store the N least significant bits of the address of the load instruction, wherein N is a positive integer smaller than the bit length of the address of the load instruction. A shorter PCLD field means smaller preload table size and lower hardware cost.

The EA field is the effective address predicted by the method for preloading data of this embodiment. The EA field is used as the memory address in data preloading. The VEA field indicates the validity of the EA field. The EA field is marked as valid by setting the VEA field and the EA field is marked as invalid by resetting the VEA field. To be more specific, the VEA field is set by storing 1 into the VEA field and the VEA field is reset by storing 0 into the VEA field.

The DATA field stores the preloaded data, which are to be forwarded to the use instruction. The VDT field indicates the validity of the DATA field. The DATA field is marked as valid by setting the VDT field and the DATA field is marked as invalid by resetting the VDT field. To be more specific, the VDT field is set by storing 1 into the VDT field and the VDT field is reset by storing 0 into the VDT field.

The STRIDE field is the increment of the effective loading address generated by the load instruction between two consecutive iterations of the instruction loop. For example, if the data are loaded from the memory address 200 in an iteration of the instruction loop and from the memory address 208 in the next iteration of the instruction loop, the STRIDE field is 8. As discussed below, the STRIDE field is used to predict the EA field.

FIG. 2 is the flow chart of the method for preloading data in a CPU pipeline according to this embodiment. FIG. 3 shows an exemplary instruction loop on which the flow in FIG. 2 is applied. PLD is the hint instruction. The hint instruction is placed by either the programmer or the compiler before the instruction loop. The instruction loop in FIG. 3 has three instructions, including the load instruction and the use instruction. LDR is the load instruction which loads the data from the memory into the register R0. The effective loading address of the load instruction LDR is stored in the register R10. The first ADD is the use instruction, which uses the data in the register R0, which is in turn written by the load instruction LDR. The second ADD instruction adds 8 to the register R10 so that the effective loading address of the load instruction LDR in the next iteration increases by 8. FIG. 4 is a table showing the contents of the preload table entry corresponding to the load instruction LDR during the flow in FIG. 2. Please refer to FIGS. 2-4 for the following discussions.

The flow in FIG. 2 begins at step 205. At step 205, an entry in the preload table is allocated and initiated when the hint instruction PLD is executed. The hint instruction PLD has an address parameter L1 and a stride parameter 8. The address parameter L1 is the address of the load instruction LDR. The address parameter L1 is stored into the PCLD field of the preload table entry and the stride parameter 8 is stored into the STRIDE field of the entry. In some other embodiments of the present invention, the PCLD field may store only the N least significant bits of the address parameter L1, wherein N is a positive integer smaller than the bit length of the address parameter L1. The fields EA and DATA are marked as invalid by resetting the fields VEA and VDT. The contents of the fields EA and DATA are insignificant for now. The resultant table entry is shown in row 1 of FIG. 4.

Next, the flow proceeds to step 210. When the load instruction LDR is fetched, the preload table entry corresponding to the load instruction LDR is located by matching the address of the load instruction LDR with the PCLD field of the preload table entries. If the PCLD field stores only the N least significant bits of the address of the load instruction LDR, the corresponding entry is located by matching the N least significant bits of the address of the load instruction LDR with the PCLD field. After the entry is located, the VEA field is checked at step 215 to determine whether the EA field is valid. As shown in row 1 of FIG. 4, the EA field is invalid. Therefore the flow skips step 220 and proceeds to step 225.

At step 225, when the use instruction ADD is executed, the preload table entry is located by matching the address of the load instruction LDR with the PCLD field of the preload table entries. The logic circuit performing dependency check in the pipeline associates the use instruction ADD with the load instruction LDR. Therefore the address of the load instruction LDR is available for locating the preload table entry when the use instruction ADD is executed. After the entry is located, the VDT field is checked at step 230 to determine whether the DATA field is valid. As shown in row 1 of FIG. 4, the DATA field is marked as invalid. Consequently the flow proceeds to step 240 to wait for the load instruction LDR to complete loading the data from the memory. In this embodiment, the memory may be a data cache inside the CPU or an external memory outside the CPU.

Next, at step 245, when the load instruction LDR is executed, the preload table entry is again located by matching the address of the load instruction LDR with the PCLD field of the preload table entries. After the entry is located, the data loaded from the memory by the load instruction LDR is compared at step 250 with the DATA field of the entry. However, at present the DATA field is marked as invalid. The data comparison is meaningless. Therefore the flow skips step 255 and proceeds to step 260.

At step 260, the sum of the effective loading address generated by the load instruction LDR and the STRIDE field is calculated and stored into the EA field of the entry. In this example, the address stored in the register R10 points to an array labeled as array1. After the calculation, the EA field becomes array1+8, as shown in row 2 of FIG. 4. In addition, the EA field is marked as valid and the DATA field is marked as invalid, as shown in row 2 of FIG. 4. Generally the data used in the current iteration of the instruction loop cannot be used again in the next iteration. Therefore the DATA field has to be marked as invalid. The proper data will be preloaded in the next iteration. After step 260, the flow returns to step 210 to begin the second iteration of the instruction loop.

In the second iteration, at step 215, the EA field is marked as valid. The flow proceeds to step 220. At step 220, the data is preloaded from the memory into the DATA field. The EA field is used as the memory address of the data preloading. The DATA field is marked as valid. The resultant preload table entry is shown in row 3 of FIG. 4.

At step 230, the DATA field is marked as valid, the flow proceeds to step 235. At step 235, since the data is preloaded into the entry at step 220, the data required by the use instruction ADD is forwarded from the DATA field of the entry instead of loaded from the memory. The response speed of the preload table is much faster than that of the memory. Therefore this embodiment is able to shorten or complete hide memory load latency.

At step 250, the data loaded by the load instruction LDR from the memory is compared with the data preloaded into the DATA field in step 220. If the data loaded from the memory is not equal to the preloaded data, the flow proceeds to step 255 to flush the CPU pipeline, starting from the use instruction ADD (the first ADD instruction in the loop). The reason of the comparison and the flushing is that the memory data may change during the period from the fetching of the load instruction to the execution of the load instruction. If the real memory data becomes different from the preloaded data, the execution result based on the erroneous preloading must be flushed.

Next, at step 260, the EA field is updated to be array1+16, which is the memory address for the data preloading in the third iteration. The DATA field is marked as invalid again, as shown in row 4 of FIG. 4. The flow proceeds to step 210 to begin the third iteration of the instruction loop. The following iterations are executed in the same way as the second iteration is executed.

In summary, the method for preloading data in a CPU pipeline in this embodiment uses hint instructions and a hardware preload table to implement data preloading in order to shorten or completely hide memory load latency in instruction loops. Due to the assistance provided by hint instructions, the data preloading of the method is properly placed and accurate. Besides, the method is capable of handling general instruction loops. The hardware implementation of the method is simple and features a low cost. The resource occupied by the preload table is directly proportional to the number of table entries, offering great flexibility between cost and performance. The method for preloading data in this embodiment can enhance pipeline throughput even when the preload table has a capacity of only one entry.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for preloading data in a CPU pipeline, comprising:
   (a) when a hint instruction is executed, allocating and initiating an entry in a preload table;
   (b) when a load instruction, whose address is specified in the preload table, is fetched, loading a piece of data from a memory into the entry according to the entry, wherein the load instruction itself is located at the address of the load instruction;
   (c) when a use instruction which uses the data loaded by the load instruction is executed, forwarding the data to the use instruction from the entry instead of loading from the memory; and
   (d) when the load instruction is executed, updating the entry according to the load instruction.

2. The method of claim 1, wherein the entry comprises an instruction address field, an effective address field, a data field, and a stride field.

3. The method of claim 2, wherein step (a) comprises:
   setting the instruction address field and the stride field according to the hint instruction, and marking the effective address field and the data field as invalid.

4. The method of claim 3, wherein the instruction address field is set according to an address parameter of the hint instruction.

5. The method of claim 4, wherein the address parameter is the address of the load instruction.

6. The method of claim 4, wherein the instruction address field is the N least significant bits of the address of the load instruction, N is a positive integer smaller than or equal to the bit length of the address of the load instruction.

7. The method of claim 3, further comprising:
   storing a stride parameter of the hint instruction into the stride field.

8. The method of claim 2, wherein step (b) comprises:
   locating the entry in the preload table by matching the address of the load instruction with the instruction address field; and
   if the effective address field is valid, loading the data from the memory into the data field using the effective address field as the memory address, and marking the data field as valid.

9. The method of claim 2, wherein step (c) comprises:
   locating the entry in the preload table by matching the address of the load instruction with the instruction address field; and
   if the data field is valid, forwarding the data for the use instruction from the data field instead of loading from the memory.

10. The method of claim 2, wherein step (d) comprises:
    locating the entry in the preload table by matching the address of the load instruction with the instruction address field;
    storing the sum of an effective loading address generated by the load instruction and the stride field into the effective address field;
    marking the effective address field as valid; and
    marking the data field as invalid.

11. The method of claim 2, wherein the entry further comprises an address validity field, the effective address field is marked as valid by setting the address validity field and the effective address field is marked as invalid by resetting the address validity field.

12. The method of claim 11, wherein the address validity field is set by storing 1 into the address validity field and the address validity field is reset by storing 0 into the address validity field.

13. The method of claim 2, wherein the entry further comprises a data validity field, the data field is marked as valid by setting the data validity field and the data field is marked as invalid by resetting the data validity field.

14. The method of claim 13, wherein the data validity field is set by storing 1 into the data validity field and the data validity field is reset by storing 0 into the data validity field.

15. The method of claim 2, wherein the load instruction and the use instruction are included in an instruction loop, and the stride field is an increment of an effective loading address generated by the load instruction between two consecutive iterations of the instruction loop.

16. The method of claim 15, wherein the hint instruction is placed before the instruction loop.

17. The method of claim 1, wherein step (d) further comprises:
   comparing the data loaded by the load instruction and the data loaded into the entry in step (b); and
   if the data loaded by the load instruction are not equal to the data loaded in step (b), flushing the CPU pipeline, starting from the use instruction.

18. The method of claim 1, wherein the memory is a data cache inside the CPU or an external memory outside the CPU.

* * * * *